(12) United States Patent
Miyazaki et al.

(10) Patent No.: US 11,940,708 B2
(45) Date of Patent: Mar. 26, 2024

(54) OPTICAL MODULATOR

(71) Applicant: SUMITOMO OSAKA CEMENT CO., LTD., Tokyo (JP)

(72) Inventors: Norikazu Miyazaki, Tokyo (JP); Kosuke Okahashi, Tokyo (JP); Masayuki Motoya, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 328 days.

(21) Appl. No.: 17/599,916

(22) PCT Filed: Sep. 26, 2019

(86) PCT No.: PCT/JP2019/037728
§ 371 (c)(1),
(2) Date: Sep. 29, 2021

(87) PCT Pub. No.: WO2020/202605
PCT Pub. Date: Oct. 8, 2020

(65) Prior Publication Data
US 2022/0197104 A1 Jun. 23, 2022

(30) Foreign Application Priority Data
Mar. 29, 2019 (JP) .................. 2019-067732

(51) Int. Cl.
*G02F 1/225* (2006.01)
*G02F 1/035* (2006.01)
*G02F 1/21* (2006.01)

(52) U.S. Cl.
CPC ............ *G02F 1/2255* (2013.01); *G02F 1/035* (2013.01); *G02F 1/212* (2021.01)

(58) Field of Classification Search
CPC ......... G02F 1/035; G02F 1/212; G02F 1/2255
See application file for complete search history.

(56) References Cited

U.S. PATENT DOCUMENTS 6,522,793 B1   2/2003 Szilagyi
6,760,493 B2 *  7/2004 Pruneri .................. G02F 1/225
                                                  385/8

(Continued)

FOREIGN PATENT DOCUMENTS

JP    2006285288 A    10/2006
JP    2012212028 A    11/2012

(Continued)

OTHER PUBLICATIONS

Jiang et al., Experimental Study of Electro-Optic Crosstalk in Parallel Silicon Photonic Mach-zehnder Modulators, 2017 Conference on Lasers and Electro-Optics (CLEO), Oct. 26, 2017, JW2A. 132.

(Continued)

*Primary Examiner* — Daniel Petkovsek
(74) *Attorney, Agent, or Firm* — IpHorgan Ltd.

(57) ABSTRACT

Provided is an optical modulator that can be driven at lower voltage through the use of differential signal output. An optical modulator includes a substrate 1 and optical waveguides (21, 22) and a control electrode that are formed on the substrate, in which the optical waveguide includes Mach-Zehnder type optical waveguide, the control electrode is provided with two ground electrodes sandwiching three signal electrodes; the three signal electrodes are constituted by second and third signal electrodes that sandwich a first signal electrode, and have a wiring structure in which one modulation signal of the differential signal is applied to the first signal electrode, and the other modulation signal of the differential signal is applied to the second and third signal electrodes; and one branched waveguide (21) out of two Mach-Zehnder type optical waveguides is disposed between the first and second signal electrodes, and the other branched (Continued)

waveguide (22) is disposed between the first and third signal electrodes.

5 Claims, 5 Drawing Sheets

(56) References Cited

U.S. PATENT DOCUMENTS

| | | | |
|---|---|---|---|
| 8,346,025 B2 | 1/2013 | Gill | |
| 11,287,720 B2* | 3/2022 | Hayashi | G02F 1/2255 |
| 2006/0210212 A1* | 9/2006 | Sugiyama | G02F 1/035 |
| | | | 385/40 |
| 2012/0251029 A1 | 10/2012 | Korbrinsky et al. | |
| 2012/0328227 A1 | 12/2012 | Hara et al. | |
| 2016/0033848 A1 | 2/2016 | Kataoka et al. | |
| 2017/0184941 A1 | 6/2017 | Kato | |
| 2022/0146901 A1* | 5/2022 | Miyazaki | G02F 1/212 |

FOREIGN PATENT DOCUMENTS

| | | |
|---|---|---|
| JP | 20137909 A | 1/2013 |
| JP | 2014191095 A | 10/2014 |
| JP | 2015197452 A | 11/2015 |
| JP | 2016194537 A | 11/2016 |
| JP | 2018180255 A | 11/2018 |
| JP | 2018205343 A | 12/2018 |

OTHER PUBLICATIONS

Japan Patent Office, International Search Report, PCT/JP2019/037728, dated Nov. 19, 2019.

* cited by examiner

OPTICAL MODULATOR

CROSS REFERENCE TO RELATED APPLICATIONS

This application is a national stage completion application of PCT Application No. PCT/JP2019/037728, filed Sep. 26, 2019, and claims priority from Japanese Patent Application No. 2019-067732, filed Mar. 29, 2019. Each of these applications is incorporated by reference herein in its entirety.

TECHNICAL FIELD

The present invention relates to an optical modulator, and more particularly to an optical modulator having at least one Mach-Zehnder type optical waveguide and driven by a differential signal.

BACKGROUND ART

In recent years, there has been an increasing need for high speed and miniaturization of optical modulators. In an optical modulator incorporating the Mach-Zehnder type optical waveguide, the electrode structure having a simple configuration and easy to use is a single-ended electrode driven at a single signal electrode (S+), as illustrated in FIG. 1. In FIG. 1, the signal electrode (S+) is disposed between two branched waveguides (21, 22) configuring a Mach-Zehnder type optical waveguide, and ground electrodes (G) are disposed on both sides of the signal electrode. Electric fields in different directions as indicated by the dotted arrows are simultaneously applied to the branched waveguides (21, 22), respectively. The configuration in which the optical waveguide is disposed between the electrodes is such that when the substrate having an electro-optic effect has a high electro-optical constant in the cross-sectional direction, such as an X-cut lithium niobate (LN) substrate, the modulation efficiency is high.

However, at operating rates above 50 Gbaud, in order to modulate high-frequency signals with as little quality degradation as possible, it is necessary to suppress loss of transmission channel at high frequencies by shortening the transmission line through which the signals propagate, or to prevent the characteristic deterioration due to reflection and loss caused by electrical connection of individual parts. Therefore, it has been studied to directly drive the optical modulator with the output signal of a digital signal processor (DSP) which is a signal processing element, or to incorporate a driver element for signal amplification into the case of the optical modulator.

A differential signal output configuration is used for the output of the DSP in order to suppress the influence of external noise or the like during the line transmission or to enable an operation at a low voltage. When driving an optical modulator having a single-ended electrode configuration as illustrated in FIG. 1, the driver element converts a signal that is input as a differential signal into a single-ended signal, amplifies the signal, and output the signal. In such a driver element, since the output of the element cannot be amplified to an amplitude sufficient for driving the optical modulator with a single semiconductor chip, the driver element is configured by using a plurality of semiconductor chips.

Further, in order to achieve miniaturization, it is effective to directly drive the optical modulator with a DSP or to incorporate a driver element for signal amplification into the case of the optical modulator. When a driver element is incorporated, it is desirable to integrate the driver element composed of a single semiconductor chip for miniaturization. In such a single-chip driver element, efficient modulation can be achieved by using the differential potential difference for modulation by using a differential signal output element. In order to cope with such a case, the optical modulator needs to be driven by a differential output.

FIG. 2 illustrates an example of an electrode configuration of an optical modulator in which a waveguide is disposed between electrodes, using both in-phase (S+) and anti-phase (S−) modulation signals of the differential signal input to the optical modulator. In FIG. 2, each signal electrode of a differential signal is disposed between the ground electrodes (G). However, as for the strength of the electric field applied to the branched waveguides (21, 22) of the Mach-Zehnder type optical waveguide, only the electric field of a strength due to the potential difference between the signal electrode (S+ or S−) and the ground electrode (G) is applied, and it cannot be driven by the potential difference between the differential signals. For this reason, even when a differential signal is used, the modulation efficiency is almost the same as when a single-ended signal is used, so that the required action portion becomes long and it is difficult to reduce the element size.

Patent Literature No. 1 discloses a configuration in which two signal electrodes are disposed for each one branched waveguide so as to apply two modulation signals of a differential signal output to each of the two branched waveguides, in a semiconductor type Mach-Zehnder optical modulator. Thus, each branched waveguide can be driven by the potential difference of the differential signal, and the drive voltage is reduced as compared with the electrode configuration of FIG. 2, but a total of four signal electrodes are disposed in one Mach-Zehnder type optical waveguide, so that the electrode structure becomes complicated and it becomes difficult to miniaturize the optical modulator.

On the other hand, in coherent communication modulators or the like, an optical modulator in which a plurality of Mach-Zehnder type optical waveguides are integrated is used, such as a nest type optical waveguide in which a plurality of Mach-Zehnder type optical waveguide are nested.

In the integrated optical modulator, the clearance between the electrodes is narrowed, and the crosstalk phenomenon of the modulation signal in the adjacent optical modulation units is likely to occur. Moreover, as the modulation speed increases, the occurrence of the crosstalk phenomenon becomes more remarkable, and the quality degradation of the modulation output becomes a big problem.

An effective method of suppressing the crosstalk phenomenon is to widen the clearance between adjacent optical modulating units, and widen the clearance between the electrodes and between lines, in the optical modulator having a plurality of Mach-Zehnder type optical waveguides. However, if the clearance between the electrodes is widened, it is necessary to widen the clearance between the optical waveguides, and the length required for bending the optical waveguide such as a branching part becomes long, which not only increases the size of the optical modulator itself but also increases the optical loss that cannot be ignored.

When a single-ended electrode as illustrated in FIG. 1 is used for each Mach-Zehnder type optical waveguide, the number of electrodes is reduced, but the potential difference of the differential signal cannot be effectively utilized. Further, when four signal electrodes are disposed for one Mach-Zehnder type optical waveguide as in Patent Literature No. 1, the clearance between the ground electrodes surrounding the signal electrodes is wider than in FIGS. 1 and 2. Therefore, the electric field tends to leak to the adjacent modulation unit (action portion), and the crosstalk phenomenon is more likely to occur.

CITATION LIST

Patent Literature

[Patent Literature No. 1] Japanese Laid-open Patent Publication No. 2018-180255

SUMMARY OF INVENTION

Technical Problem

An object to be solved by the present invention is to solve the above-mentioned problems and to provide an optical modulator that can be driven at lower voltage through the use of differential signal output. Moreover, the object of the present invention is to provide an optical modulator in which a plurality of Mach-Zehnder type optical waveguides are integrated, and with which occurrence of a crosstalk phenomenon is suppressed.

Solution to Problem

In order to solve the above problems, the optical modulator of the present invention has the following technical features.

(1) An optical modulator including: a substrate having an electro-optic effect; and optical waveguides and a control electrode that are formed on the substrate, in which the optical waveguide includes at least one Mach-Zehnder type optical waveguide, the control electrode includes two ground electrodes sandwiching three signal electrodes, the three signal electrodes are composed of a first signal electrode, and second and third signal electrodes that sandwich the first signal electrode, and have a wiring structure in which one modulation signal of a differential signal is applied to the first signal electrode, and the other modulation signal of the differential signal is applied to the second and third signal electrodes, and one branched waveguide of two branched waveguides of the Mach-Zehnder type optical waveguide is disposed between the first and second signal electrodes, and the other branched waveguide is disposed between the first and third signal electrodes.

(2) In the optical modulator according to (1) above, the wiring structure includes a conversion line for converting an input wiring for input a set of differential signals into one output wiring for outputting one of the modulation signals of the differential signal, and two output wirings for outputting the other modulation signal of the differential signal.

(3) In the optical modulator according to (2) above, the conversion line is provided on a relay substrate disposed outside the substrate having an electro-optic effect.

(4) In the optical modulator according to any one of (1) to (3) above, a driver circuit that outputs the differential signal is provided on a relay substrate disposed outside the substrate having an electro-optic effect.

(5) In the optical modulator according to any one of (1) to (4) above, at least a part of the first to third signal electrodes is divided into two electrodes along an extending direction of the optical waveguide, and an electrical connection is partially provided between the divided electrodes along the extending direction.

(6) In the optical modulator according to any one of (1) to (5) above, the optical waveguide has a structure in which a plurality of the Mach-Zehnder type optical waveguides are disposed in parallel, and a crosstalk suppressing unit for suppressing signal crosstalk is provided on the ground electrode sandwiched between the Mach-Zehnder type optical waveguides adjacent to each other.

Advantageous Effects of Invention

According to the present invention, it is possible to provide an optical modulator including: a substrate having an electro-optic effect; and optical waveguides and a control electrode that are formed on the substrate, in which the optical waveguide includes at least one Mach-Zehnder type optical waveguide, the control electrode includes two ground electrodes sandwiching three signal electrodes, the three signal electrodes are composed of a first signal electrode, and second and third signal electrodes that sandwich the first signal electrode, and have a wiring structure in which one modulation signal of a differential signal is applied to the first signal electrode, and the other modulation signal of the differential signal is applied to the second and third signal electrodes, and one branched waveguide of two branched waveguides of the Mach-Zehnder type optical waveguide is disposed between the first and second signal electrodes, and the other branched waveguide is disposed between the first and third signal electrodes, so that the optical modulator can be driven at lower voltage through the use of differential signal output.

DESCRIPTION OF EMBODIMENTS

Hereinafter, an optical modulator of the present invention will be described in detail with reference to suitable examples.

Figure 3:
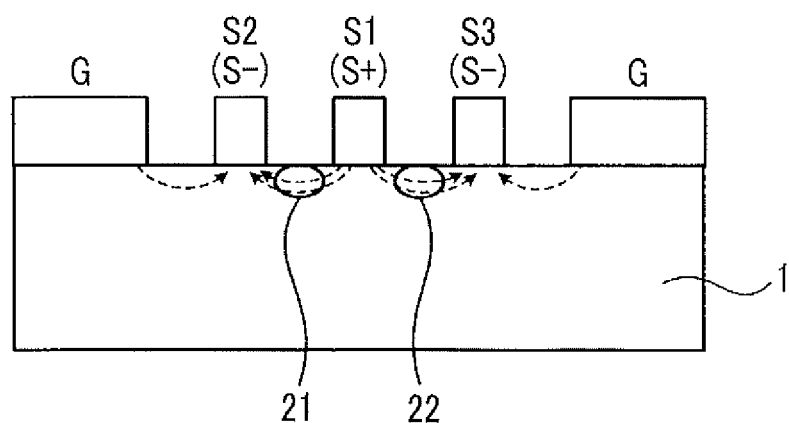
FIG. 3 is a diagram illustrating a first embodiment of an optical modulator of the present invention.

The optical modulator of the present invention is an optical modulator, as illustrated in FIG. 3, in which optical waveguides (21, 22) and a control electrode are formed on a substrate 1 having an electro-optic effect, the optical waveguide including at least one Mach-Zehnder type optical waveguide, in which the control electrode includes two ground electrodes sandwiching three signal electrodes, the three signal electrodes are composed of a first (S1) signal electrode, and second (S2) and third (S3) signal electrodes that sandwich the first signal electrode, and have a wiring structure in which one modulation signal (S+) of a differential signal is applied to the first signal electrode, and another modulation signal (S−) of the differential signal is applied to the second and third signal electrodes, and one branched waveguide (21) of two branched waveguides of a Mach-Zehnder type optical waveguide is disposed between the first and second signal electrodes, and the other branched waveguide (22) is disposed between the first and third signal electrodes, respectively.

As the substrate having an electro-optic effect used in the present invention, a dielectric substrate of lithium niobate or the like, a resin substrate of EO polymer or the like, a semiconductor substrate, and the like can be used. In the case of using a dielectric substrate in the present invention, a substrate of a material having the largest electro-optic effect in a direction parallel to the surface of the substrate, such as an X-cut lithium niobate substrate is used.

When an LN substrate is used, the optical waveguide can be formed by thermally diffusing Ti or the like. Further, as will be described later, an optical waveguide can be formed by providing a raised portion (rib portion) on the substrate.

The control electrode is formed by forming an electric conductor such as Au on a substrate by a plating method. The optical modulator of the present invention is particularly characteristic in the electrode structure of the signal electrodes (S1 to S3) to which a modulation signal is applied and the ground electrode (G).

As illustrated in FIG. 3, the present invention is characteristic in that two ground electrodes (G) sandwiching three signal electrodes (S1 to S3) are provided, one modulation signal (S+) of the differential signal is applied to the first electrode (S1), and the other modulation signal (S−) is applied to the second signal electrode (S2) and the third signal electrode (S3). Then, one of the two branched waveguides (21) of the Mach-Zehnder type optical waveguide is disposed between the first and the second signal electrodes, and the other branched waveguide (22) is disposed between the first and the third signal electrodes.

Figure 1:
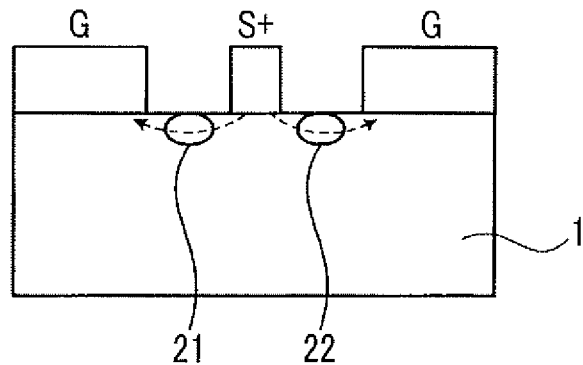
FIG. 1 is a diagram illustrating a structure of a single-ended electrode used in an optical modulator in the related art.
Figure 2:
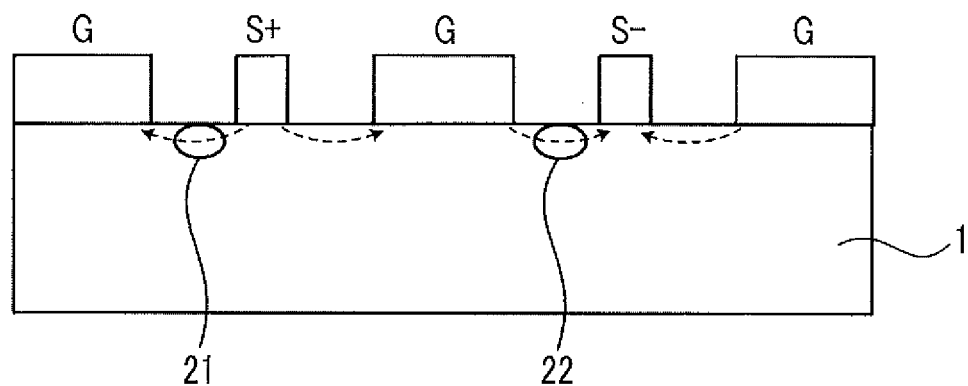
FIG. 2 is a diagram illustrating an example of an electrode configuration using both modulation signals (S+, S−) of the differential signal output used in the optical modulator in the related art.

In the single-ended electrode of FIG. 1 and the electrode structure of FIG. 2 (GSGSG type electrode structure), only the electric field corresponding to the potential difference between one modulation signal (S+, S−) of the differential signal and the ground electrode is applied to the optical waveguide. On the other hand, by adopting the electrode structure as illustrated in FIG. 3, an electric field due to the potential difference of the differential signal can be generated between the signal electrodes (between S1 and S2 and between S1 and S3). Since the electric field in FIG. 3 has an electric field strength nearly twice that in the case of FIG. 1 or 2, it is possible to further enhance the effect of lowering the drive voltage by the differential signal. Moreover, since the total number of signal electrodes is three, the wiring structure is not complicated and the size can be reduced as compared with the case of using the four signal electrodes described in Patent Literature No. 1.

Figure 4:
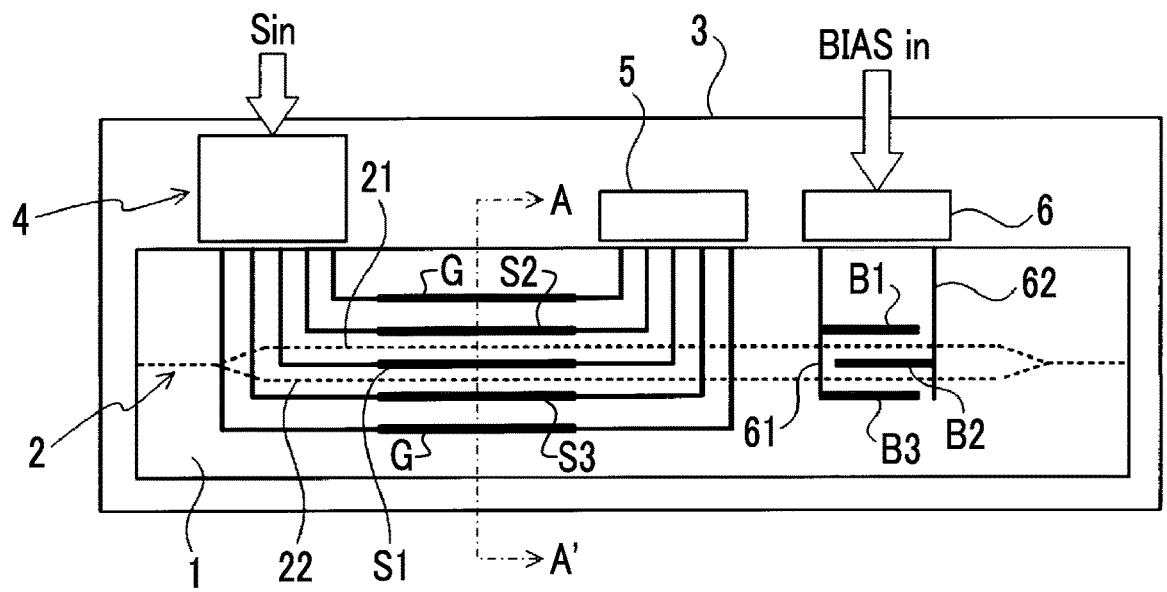
FIG. 4 is a plan view illustrating the optical modulator using the electrode structure illustrated in FIG. 3.

FIG. 4 is a plan view illustrating an outline of an optical modulator in which the electrode structure of FIG. 3 is implemented. Optical waveguides 2 (21, 22) and control electrodes (signal electrodes S1 to S3, and ground electrode G) are formed on the substrate 1. FIG. 3 is a cross-sectional view of the optical modulation element (substrate 1) taken along an alternate long and short dash line of FIG. 4. A relay substrate 4 and a termination substrate 5 having a termination resistor are disposed outside the substrate 1, and these are housed in the case 3 together with the substrate 1 to form an optical modulator. Further, as illustrated in FIG. 4, bias electrodes (B1 to B3) for adjusting the operating point of the Mach-Zehnder type modulator may be separately provided. As illustrated in FIG. 4, a DC bias voltage is supplied to the bias electrodes (B1 to B3) through the relay substrate 6 via the wirings 61 and 62. It is also possible to omit the relay substrate and electrically connect the power supply input pins to the wirings 61 and 62.

An input signal (Sin) including a differential signal having a higher high-frequency than the outside of the optical modulator is introduced into the relay substrate 4. Since the differential signal has only two signal terminals (S+ and S−) and a ground terminal, a conversion line for conversion to a combination of three signal electrodes (for example, one S+ and two S−) and ground electrodes as illustrated in FIG. 3 or 4 is required. The conversion line can be provided on the relay substrate 4, but can also be provided on the electrode line up to the action portion (modulation unit) of the substrate 1 if necessary.

Figure 5:
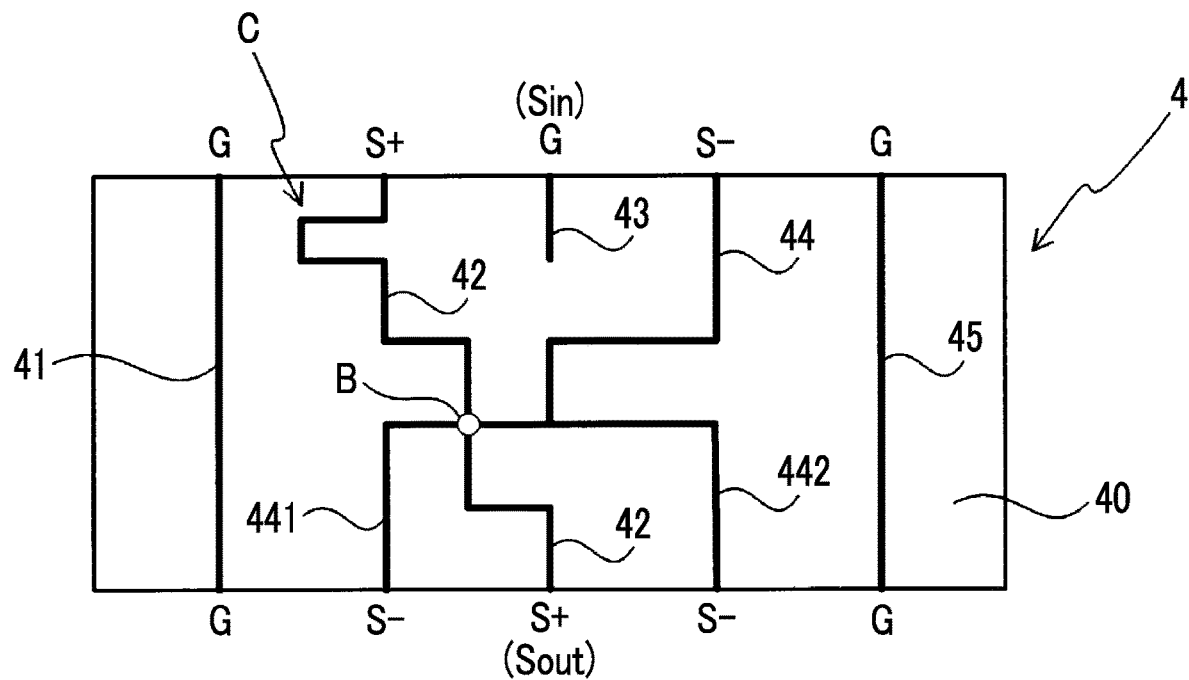
FIG. 5 is a diagram illustrating an example of a conversion line that can be used in the optical modulator of the present invention.

FIG. 5 illustrates a schematic diagram of the conversion line of the relay substrate 4. As terminals for high-frequency input signals (Sin), five terminals corresponding to G, S+, G, S−, and G are prepared. In some cases, there is no central G terminal. The lower side of the relay substrate 4 is a terminal for an output signal (Sout), and five terminals corresponding to G, S−, S+, S−, and G are prepared. The input side and the output side are electrically connected by electric lines (41 to 45, 441, and 442).

The S+ terminal on the input side has an electric line 42 formed corresponding to the S+ terminal on the output side. In FIG. 5, the portion indicated by reference symbol C is a delay circuit for matching the phase with the modulation signal of S−. Further, the S-terminal on the input side is connected to two electric lines (441, 442) into which the electric line 44 is branched, in accordance with the two S− terminals on the output side. On the way, the electric line 42 for S+ and the electric line 441 for S− intersect at reference symbol B, but the lines are disposed in different layers using a multilayer substrate or the like so as not to be electrically connected. Further, since the central ground terminal G is unnecessary on the output side, it is connected to the ground layer of the relay substrate or the ground electrode on the back surface, but the terminal is not provided on the output side. FIG. 5 only illustrates the concept as a schematic diagram, and in reality, a multilayer substrate is used to design a pattern or the like so as to satisfy the performance required for high-frequency performance.

Figure 6:
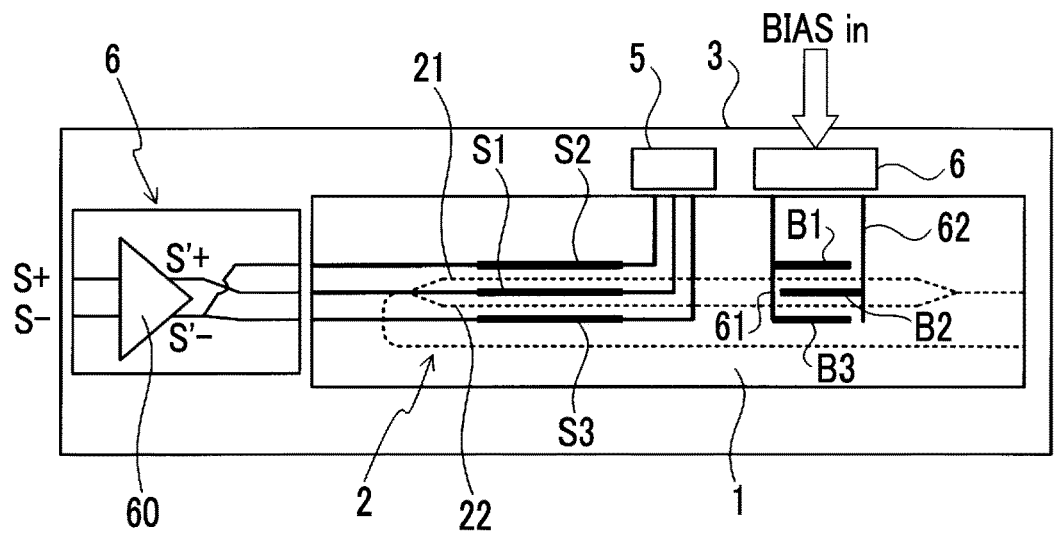
FIG. 6 is a diagram illustrating an example of incorporating a driver element and the conversion line into a relay substrate.

FIG. 6 is an example in which the input and output terminals of electric signals or the like are disposed on the left hand side of the case 3, and the input and output portions of the optical system such as optical fibers are disposed on the right hand side. The substrate 1 has a rectangular shape when viewed in a plan view, and a relay substrate 6 for receiving a modulation signal or the like is disposed on the left short side of the substrate 1. Such a configuration is advantageous when modulating a high-frequency signal because the input portion of the high-frequency electric signal to the action portion of the optical modulator can be disposed substantially linearly at a short distance. For the input and output terminals of the high-frequency electric signals, a coaxial connector, a feedthrough, an FPC, or the like is used.

The optical waveguide 2 formed on the substrate 1 is configured such that a light wave entering from the right side is folded back in the middle and is input to the Mach-Zehnder type optical waveguide. FIG. 6 illustrates a case where 180° folding is performed in the substrate, but 180° folding is performed outside the substrate together with the bending of the optical waveguide in the substrate by using the optical element and other optical waveguide substrate. A driver element 60 for amplifying a differential signal is disposed on the relay substrate 6, and the differential signals (S'+, S'−) output from the driver element 60 are input to the optical modulation element provided on the substrate 1, via the conversion line. In FIG. 6, the ground electrode relationship is omitted for the sake of simplification of the drawing. Further, although FIG. 6 illustrates a case where the driver element is incorporated into the optical modulator, the driver element may not be mounted on the relay substrate, and the differential signal input to the optical modulator may be directly modulated. The modulation signal is input to the termination substrate 5 having a termination resistor via the signal electrodes (S1 to S3).

The relay substrate 6 as illustrated in FIG. 5 can also be suitably used when the driving driver is integrated in the optical modulator. Further, since the driver element 60 capable of differential output is used, it is possible to use a semiconductor element having a low power supply voltage and low power consumption as compared with the single-ended electrode of FIG. 1. Since the driver element capable of differential output can obtain the signal amplitude required for the optical modulator with a single semiconductor chip, the configuration of the relay substrate can be simplified and miniaturized.

When a driver element is integrated, the relay substrate is provided with patterns and terminals for power supply necessary for driving the driver in addition to the differential high-frequency line, and peripheral elements such as capacitors and inductors are also disposed in some cases. A part of the power supply of the driver element may be supplied from the output terminal of the driver, and in that case, it is also possible to pass through the electrodes of the optical modulator. In that case, since the DC voltage is applied, the problem of operating point fluctuation of the Mach-Zehnder type modulator due to DC drift occurs in the LN modulator or the like. On the other hand, power is supplied to the driver element by applying the same DC voltage superimposed on the high-frequency signal to the first signal electrode S1 (S'+), and the second (S2) and third' (S3) signal electrodes (S'−) of the optical modulation element, so that it is possible to prevent bias drift in the Mach-Zehnder type optical modulator due to the signal electrode portion. It is also possible to perform control by applying a DC bias voltage to the bias electrodes (B1 to B3) in FIG. 6 so as to compensate for the bias drift generated at the signal electrodes.

Figure 7:
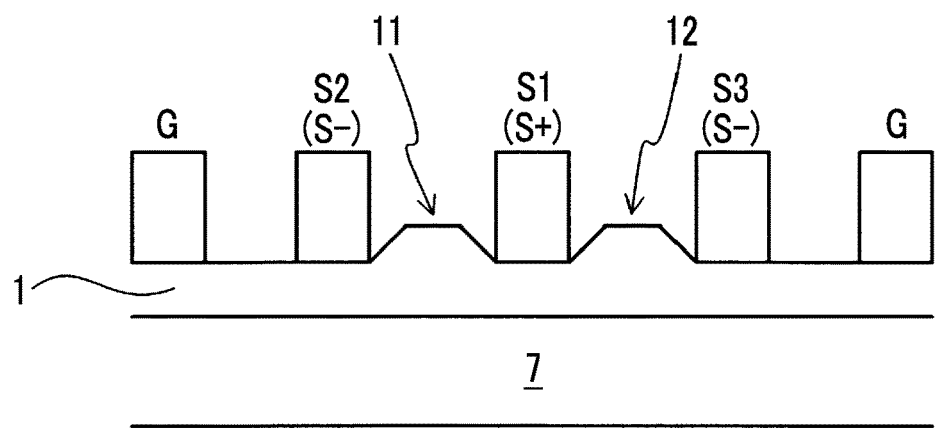
FIG. 7 is a diagram illustrating a second embodiment of the optical modulator of the present invention.

FIGS. 7 to 10 illustrate an example in which a thin plate (20 μm or lower) is used for the substrate 1 and a rib structure is adopted for the waveguide. In addition to that, various structures such as a diffused waveguide can be used for the waveguide structure. When using the substrate 1 of the thin plate, as illustrated in FIG. 7, a holding substrate 7 for holding the substrate 1 is joined to the substrate 1. For the holding substrate 7, a material having a lower refractive index than that of the electro-optical substrate 1 (a dielectric substrate of LN or the like, an EO polymer, a semiconductor, or the like) is used. For example, quartz, glass, resin, and the like are used.

It is also possible to dispose another holding substrate under the substrate 1 via a low refractive index layer. The low refractive index layer in this case may be an adhesive layer such as resin. When the holding substrate is disposed via the low refractive index layer, the same material as the substrate 1 or a high refractive index material such as silicon can be used for the holding substrate.

The optical modulator of the present invention uses a thin plate substrate as illustrated in FIG. 7 and combines a so-called "thin plate rib structure" in which an optical waveguide is composed of rib portions (11, 12) to achieve higher modulation efficiency. Moreover, it is possible to reduce the size of the optical modulation element. In particular, by sandwiching the rib portion (11 or 12) between the signal electrodes (S1 and S2, or S1 and S3) to which the differential signal is input, the electric field generated between the signal electrodes can be efficiently applied to the optical waveguide of the rib portion.

Figure 8:
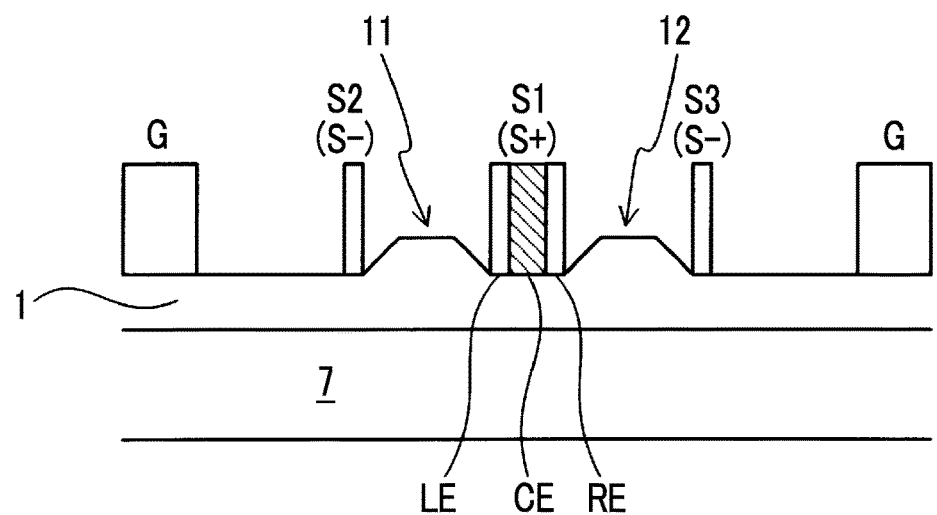
FIG. 8 is a diagram illustrating a third embodiment of the optical modulator of the present invention.

By narrowing the clearance between the signal electrodes (S1 to S3), it is possible to achieve a structure having higher modulation efficiency. However, when the electrode clearance is narrowed, the capacity between the signal electrodes increases, so that the impedance of the line tends to decrease. Therefore, as illustrated in FIG. 8, by dividing the central signal electrode S1 into two electrodes, the capacity between the electrodes can be reduced, and the decrease in impedance can be suppressed without lowering the modulation efficiency. Moreover, in this case, since it is not necessary to narrow the clearance between the optical waveguides, the characteristic deterioration due to the crosstalk of light between the optical waveguides does not occur.

Figure 9:
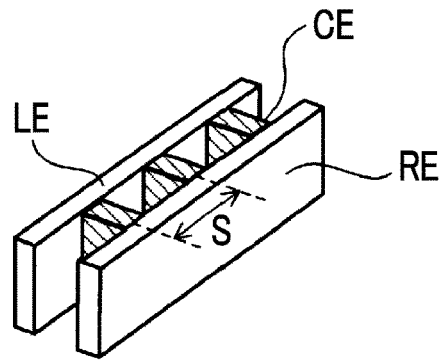
FIG. 9 is a diagram illustrating a state in which signal electrodes are divided in the optical modulator of the present invention.

A perspective view of the signal electrode S1 of FIG. 8 is illustrated in FIG. 9. Since the signal electrode is disposed along the optical waveguide, the electrode is divided into two electrodes along the extending direction of the optical waveguide. The divided electrodes (LE, RE) are partially electrically connected along the extending direction in order to prevent the occurrence of a potential difference between the electrodes. The connection portion CE for making an electrical connection is made of the same material as the divided electrodes and can be integrally formed. The arrangement clearance of the divided connection portions CE is preferably one-fourth or lower, preferably about one-tenth of the wavelength of the microwave having a frequency equal to the modulation frequency or the modulation symbol rate used in the modulation signal.

Figure 10:
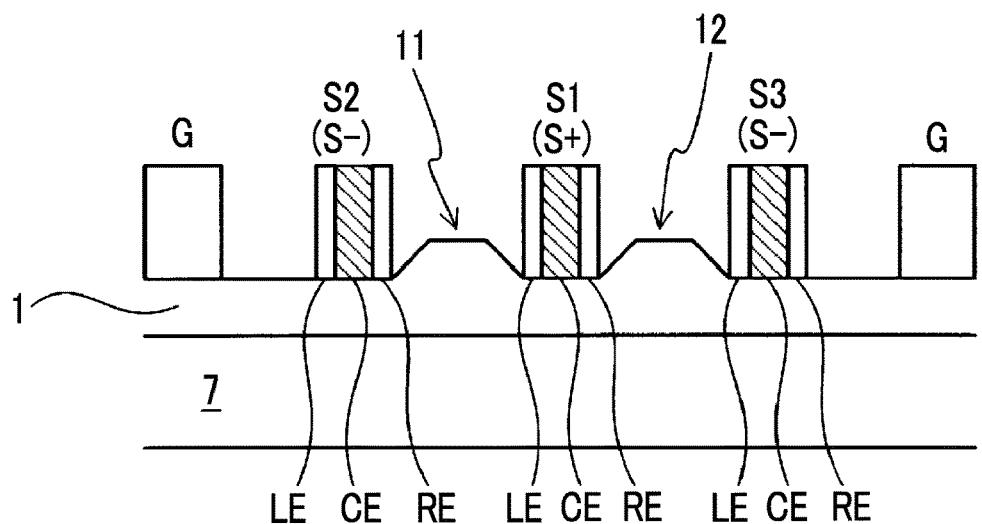
FIG. 10 is a diagram illustrating a fourth embodiment of the optical modulator of the present invention.

In FIG. 10, not only the first signal electrode S1, but also the second signal electrode S2 and the third signal electrode S3 are subjected to electrode division processing. Dividing the signal electrode is not only for impedance countermeasures, but also has the effect of reducing the contact area between the signal electrode and the substrate 1 and suppressing the generation of internal stress due to the difference in the linear expansion coefficient between the signal electrode and the substrate 1.

Figure 11:
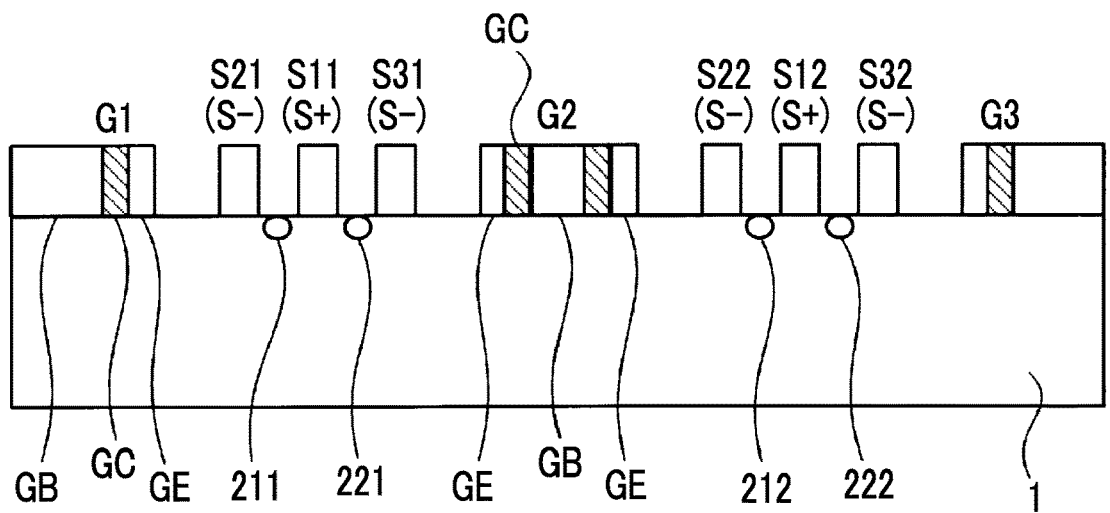
FIG. 11 is a diagram illustrating a fifth embodiment of the optical modulator of the present invention.
Figure 13:
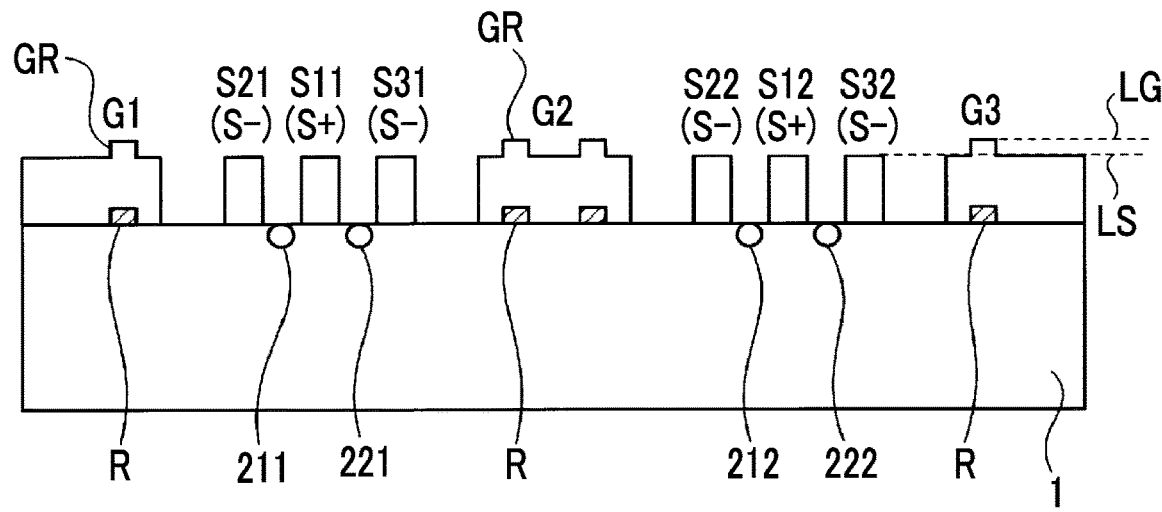
FIG. 13 is a diagram illustrating a sixth embodiment of the optical modulator of the present invention.

When the optical modulator of the present invention is provided with an optical waveguide in which a plurality of Mach-Zehnder type optical waveguides are disposed in parallel, such as a nest type optical waveguide, suppression of electrical crosstalk is also an important issue. FIGS. 11 and 13 illustrate cross-sectional views of two adjacent Mach-Zehnder type optical waveguides cut perpendicular to the traveling direction of the light wave. Reference symbols 211 and 221 (or 212 and 222) are two branched waveguides configuring the Mach-Zehnder type optical waveguide.

Further, a feature of the present invention is to provide a crosstalk suppressing unit for suppressing crosstalk of an electric signal. As illustrated in FIGS. 11 and 13, three signal electrodes (S21, S11 and S31, or S22, S12 and S32) are disposed between the ground electrodes (between G1 and G2 or between G2 and G3), so that the clearance between the ground electrodes becomes wider than usual. Therefore, the electric field tends to leak to the adjacent modulation unit, and the crosstalk phenomenon tends to occur.

As the crosstalk suppressing unit, in FIG. 11, in the ground electrodes (G1 to G3), the side surface portion GE facing the signal electrode (S21 or the like) is separated from the other main body portion GB, and electrical connection portions GC are partially provided between the side surface portion GE and the main body portion GB along the extending direction of the optical waveguide.

In this way, by separating the side surface portion GE of the ground electrode from the main body portion GB, the electric field formed between the signal electrode and the ground electrode is concentrated on the side surface portion GE, and the electric field does not leak to a modulation unit having an adjacent Mach-Zehnder type optical waveguide.

Figure 12:
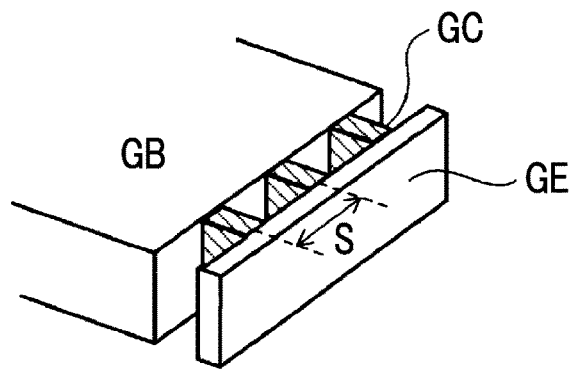
FIG. 12 is a diagram illustrating a state in which a ground electrode is divided, in the optical modulator of the present invention.

As illustrated in FIG. 12, the connection portion GC that electrically connects the side surface portion GE and the main body portion GB of the ground electrode is partially disposed along the direction in which the side surface portion GE extends (the optical waveguide extends). The connection portion GC is made of the same material as the side surface portion GE and the main body portion GB, and can be integrally formed. The arrangement clearance of the connection portions GC is preferably one-fourth or lower, preferably about one-tenth of the wavelength of the microwave having a frequency equal to the modulation frequency or the modulation symbol rate used in the modulation signal.

Figure 14:
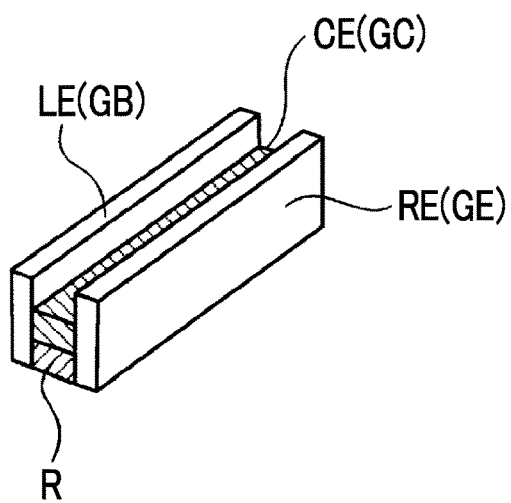
FIG. 14 is a diagram illustrating application examples of FIGS. 9 and 12.

Instead of the configuration of the connection portion (CE, GC) for making an electrical connection illustrated in FIGS. 9 and 12, a configuration in which a thin connection portion CE (GC) is disposed on the dielectric layer R as illustrated in FIG. 14 may be adopted. Further, it is possible to adopt a configuration in which the connection portions are partially disposed as illustrated in FIG. 9 or FIG. 12.

As another crosstalk suppressing unit, as illustrated in FIG. 13, at least a part of the upper surface (height LG) of the ground electrodes (G1 to G3) is higher than the upper surface (height LS) of the signal electrode (S21 or the like). In FIG. 13, for convenience, the heights are compared using the signal electrode S32 and the ground electrode G3, but the configuration also applies to the relationship between the signal electrodes (S21, S11 and S31, or S22, S12 and S32) and the ground electrode G2.

As a method of locally forming a high portion on the upper surface of the ground electrode, as illustrated in FIG. 13, when a partially formed dielectric layer R is used and the ground electrodes (G1 to G3) are laminated on the partially formed dielectric layer R, a protrusion is formed on the upper surface of the ground electrode corresponding to the dielectric layer 3. This protrusion prevents the electric field related to crosstalk from straddling the ground electrode and reaching the adjacent Mach-Zehnder type optical waveguide or the adjacent signal electrode. The dielectric layer 3 is formed by filming and patterning a dielectric such as SiO2. It is also possible to use a resin such as a permanent resist that can be patterned by photolithography. In this case, since a thicker layer can be obtained as compared with the case where a dielectric material is filmed, the protrusion becomes higher, which is effective in suppressing crosstalk.

INDUSTRIAL APPLICABILITY

As described above, according to the present invention, it is possible to provide an optical modulator capable of driving at a lower voltage by using a differential signal output. Moreover, it is possible to provide an optical modulator in which a plurality of Mach-Zehnder type optical waveguides are integrated, and with which occurrence of a crosstalk phenomenon is suppressed.

REFERENCE SIGNS LIST 1 substrate having electro-optic effect
2 optical waveguide
21, 22 branched waveguide
3 case
4, 6 relay substrate
5 termination substrate
7 holding substrate
60 driver element
S1, S11, S12 first signal electrode
S2, S21, S22 second signal electrode
S3, S31, S32 third signal electrode
G, G1 to G3 ground electrode

The invention claimed is:
1. An optical modulator comprising:
a substrate having an electro-optic effect and the thickness of the substrate being 20 μm or less;
an optical waveguide having a rib structure, the optical waveguide includes at least one Mach-Zehnder type optical waveguide; and
a control electrode that is formed on the substrate, the control electrode includes two ground electrodes sandwiching three signal electrodes, the three signal electrodes are composed of a first signal electrode, and second and third signal electrodes that sandwich the first signal electrode, and have a wiring structure in which one modulation signal of a differential signal is applied to the first signal electrode, and the other modulation signal of the differential signal is applied to the second and third signal electrodes, and one branched waveguide of two branched waveguides of the Mach-Zehnder type optical waveguide is disposed between the first and second signal electrodes, and the other branched waveguide is disposed between the first and third signal electrodes, and at least a part of the first to third signal electrodes is divided into two electrodes along an extending direction of the optical waveqiude, and an electrical connection is partially provided between the divided electrodes along the extending direction.

2. The optical modulator according to claim 1,
the wiring structure includes a conversion line for converting an input wiring for input a set of differential signals into one output wiring for outputting the one modulation signal of the differential signal, and two output wirings for outputting the other modulation signal of the differential signal.

3. The optical modulator according to claim 2, wherein the conversion line is provided on a relay substrate disposed outside the substrate having an electro-optic effect.

4. The optical modulator according to claim 1, wherein a driver circuit that outputs the differential signal is provided on a relay substrate disposed outside the substrate having an electro-optic effect.

5. The optical modulator according to claim 1, wherein the optical waveguide has a structure in which a plurality of the Mach-Zehnder type optical waveguides are disposed in parallel, and
a crosstalk suppressing unit that suppresses signal crosstalk is provided on the ground electrode sandwiched between the Mach-Zehnder type optical waveguides adjacent to each other.

* * * * *